United States Patent [19]

Ikuta

[11] Patent Number: 5,318,246
[45] Date of Patent: Jun. 7, 1994

[54] DRAG APPARATUS FOR A FISHING REEL
[75] Inventor: Takeshi Ikuta, Sakai, Japan
[73] Assignee: Shimano Inc., Osaka, Japan
[21] Appl. No.: 887,868
[22] Filed: May 26, 1992

[30] Foreign Application Priority Data

May 29, 1991 [JP] Japan .................................. 3-124162
Jan. 22, 1992 [JP] Japan .............................. 4-001716[U]

[51] Int. Cl.⁵ ............................................ A01K 89/015
[52] U.S. Cl. ................................. 242/303; 192/82 T;
242/269; 242/271
[58] Field of Search .............. 242/271, 270, 269, 303,
242/286; 192/82 T

[56] References Cited

U.S. PATENT DOCUMENTS

| | | | |
|---|---|---|---|
| 3,322,369 | 5/1967 | Haenelt, Jr. | 242/269 |
| 3,642,231 | 2/1972 | Fleischer | 242/271 |
| 3,804,349 | 4/1974 | Serimi et al. | 242/303 X |
| 4,471,861 | 9/1984 | McIntosh | 192/82 T |
| 4,683,997 | 8/1987 | Stockmar et al. | 192/82 T X |
| 4,868,437 | 9/1989 | Wagner et al. | 192/82 T X |
| 4,889,952 | 2/1990 | Aoki . | |
| 4,917,225 | 4/1990 | Diehl et al. | 192/82 T |

FOREIGN PATENT DOCUMENTS 2251535 7/1992 United Kingdom .

Primary Examiner—Clifford D. Crowder
Assistant Examiner—John J. Calvert
Attorney, Agent, or Firm—Dickstein, Shapiro & Morin

[57] ABSTRACT

A drag apparatus for a fishing reel capable of automatically compensating for variations of a braking force due to heat generated with a drag mechanism during use. The drag apparatus comprises a spool having a spool shaft, a drive transmitting device for rotating the spool, the drag mechanism, and a braking force compensating device. The drag mechanism includes a first contact member operatively connected to the spool, and a second contact member operatively connected to the drive transmitting device. The first and second contact members are contactable with each other to apply a braking force to the spool. The braking force compensating device is operable to vary a distance between the first and second contact members in proportion to heat generated with the drag mechanism during use, thereby to offset variations of the braking force caused by the heat.

19 Claims, 9 Drawing Sheets

DRAG APPARATUS FOR A FISHING REEL

BACKGROUND OF THE INVENTION

1. Field of the Invention

This invention relates to an improvement in a drag apparatus for a fishing reel, and more particularly to a drag apparatus provided for a spool of a fishing reel or mounted in a transmission line for driving the spool, the drag apparatus being capable of applying a variable braking, or drag, force to rotation of the spool by adjusting a distance between contact members.

2. Description of the Related Art

A baitcasting reel, for example, is one type of reel having the above construction. This type of reel has a spool rotatably mounted on a spool shaft, and a drag apparatus for braking the spool. The drag apparatus includes a friction member formed of stainless steel and attached to a side surface of the spool, and a braking member opposed to the friction member. The braking member is interlocked to a handle, and is placed in contact with the friction member under a predetermined pressure when a fishing line is wound up. Drive is transmitted to the spool through contacting surfaces of the braking member and friction member. A lever type or dial type drag controller is provided for adjusting the pressure of contact between the friction member and braking member.

In an actual fishing situation, a tension exceeding a predetermined value may act on the fishing line while the angler attempts to land a fish. To prevent breaking of the fishing line, it is desirable to allow the fishing line to be unwound by slipping the drag apparatus. Thus, varied braking forces may be set to the drag apparatus to cope with different types and sizes of fish and different tensile strengths of fishing lines.

For catching large fish, the fishing line is required to have a high tensile strength. The drag apparatus also is set to a strong braking force according to the fishing line used. In the course of a drawn-out struggle with a fish, slips of the drag apparatus generate heat on friction surfaces. This heat may produce a detrimental effect to cause the friction surfaces to slip more easily or less easily than is intended. In either case, a desired braking force cannot be obtained from the drag apparatus.

Some drag apparatus have a lubricant such as grease applied to the surfaces of contact for uniform slipping over the entire circumference of the contact members, and others do not. In the type having a lubricant, the heat generated through use decreases viscosity of the lubricant, thereby to lower the braking force below a set value. In the type having no lubricant, the heat generated through use expands components of the drag apparatus including the spool, whereby the pressure between the contact members is raised to increase the braking force above the set value.

Various inconveniences result from the variations in the braking force of the drag apparatus occurring in the course of a struggle with a fish as noted above. Where the braking force increases due to the heat, a tension exceeding a critical value tends to act on the fishing line to break the latter. Where the braking force decreases due to the heat, fish retrieval efficiency is lowered and, in some cases, fish may become unhooked with relaxation of the fishing line.

The drag controller may be operated again to return the varied braking forces to the set value. However, it is difficult in an actual fishing situation to carry out such a delicate operation while struggling with fish.

SUMMARY OF THE INVENTION

The object of the present invention is to provide an improved drag apparatus which imparts a braking force invariable with a temperature increase.

A drag apparatus is provided, according to the present invention, for a fishing reel to be capable of applying a braking force to rotation of a spool by adjusting a pressure between braking members. This drag apparatus includes a braking force (drag force) compensating device operable, based on a temperature increase at a contact position between the braking members, to increase or decrease the pressure between the braking members, thereby to offset variations of the braking force caused by the heat.

Functions and effects of the present invention will be described with reference to FIG. 1 showing a preferred embodiment (which is the type in which, in the absence of the braking force compensating device (drag force compensating device), the braking force will decrease due to the heat of a drag mechanism). When the drag mechanism D is heated, the braking force compensating device C decreases a distance between a braking member 29 and a spool 3 in proportion to its temperature. This results in an increased pressure between the two contact members to compensate for a decrease of the braking force due to the heating, thereby to maintain a predetermined braking force.

In FIG. 1, the braking force compensating device C utilizes thermal expansion of oil 39, and is disposed between the spool 3 and a restrictor S. When heat is conducted from the drag mechanism D to the braking force compensating device C, the thermal expansion of the oil 39 displaces the spool 3, through a cylinder fixed to the spool 3, toward the braking member 29, thereby to compensate for a decrease of the braking force.

Another preferred embodiment of the invention is shown in FIG. 10 (which is the type in which, in the absence of the compensating device, the braking force will increase due to the heat of the drag mechanism). When the drag mechanism D is heated, the braking force compensating device C increases a distance between a braking member 29 and a friction member 30 on the spool 3 in proportion to its temperature. This results in a decreased pressure between the two contact members to compensate for an increase of the braking force due to the heating, thereby to maintain a predetermined braking force. In this construction, the braking member 29 is formed of a bimetal, a shape memory alloy or other thermally deformable material to act also as the braking force compensating device C.

Thus, according to the present invention, the contact pressure between friction surfaces is automatically increased or decreased in response to a temperature increase, without requiring the braking force of the drag mechanism to be adjusted manually during a struggle with fish. The braking force compensating device offsets variations of the braking force due to the heat, to maintain a predetermined braking force.

Other features and advantages of the present invention will be understood from the following description taken with reference to the accompanying drawings.

DETAILED DESCRIPTION OF THE PREFERRED EMBODIMENTS

A fishing reel according to the present invention will be described with reference to the drawings.

Figure 1:
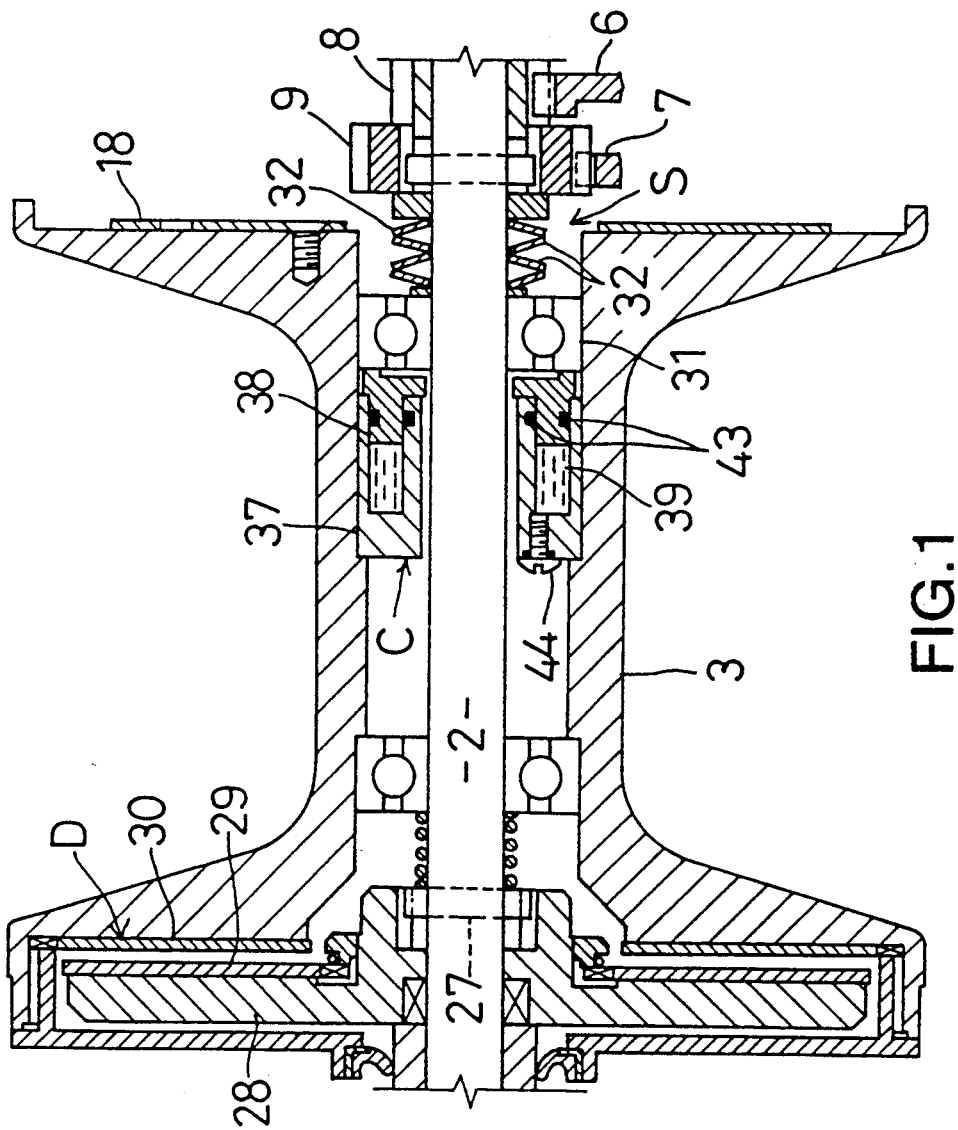
FIG. 1 is a sectional view showing a braking force compensating device in a drag apparatus for a fishing reel according to the present invention.
Figure 2:
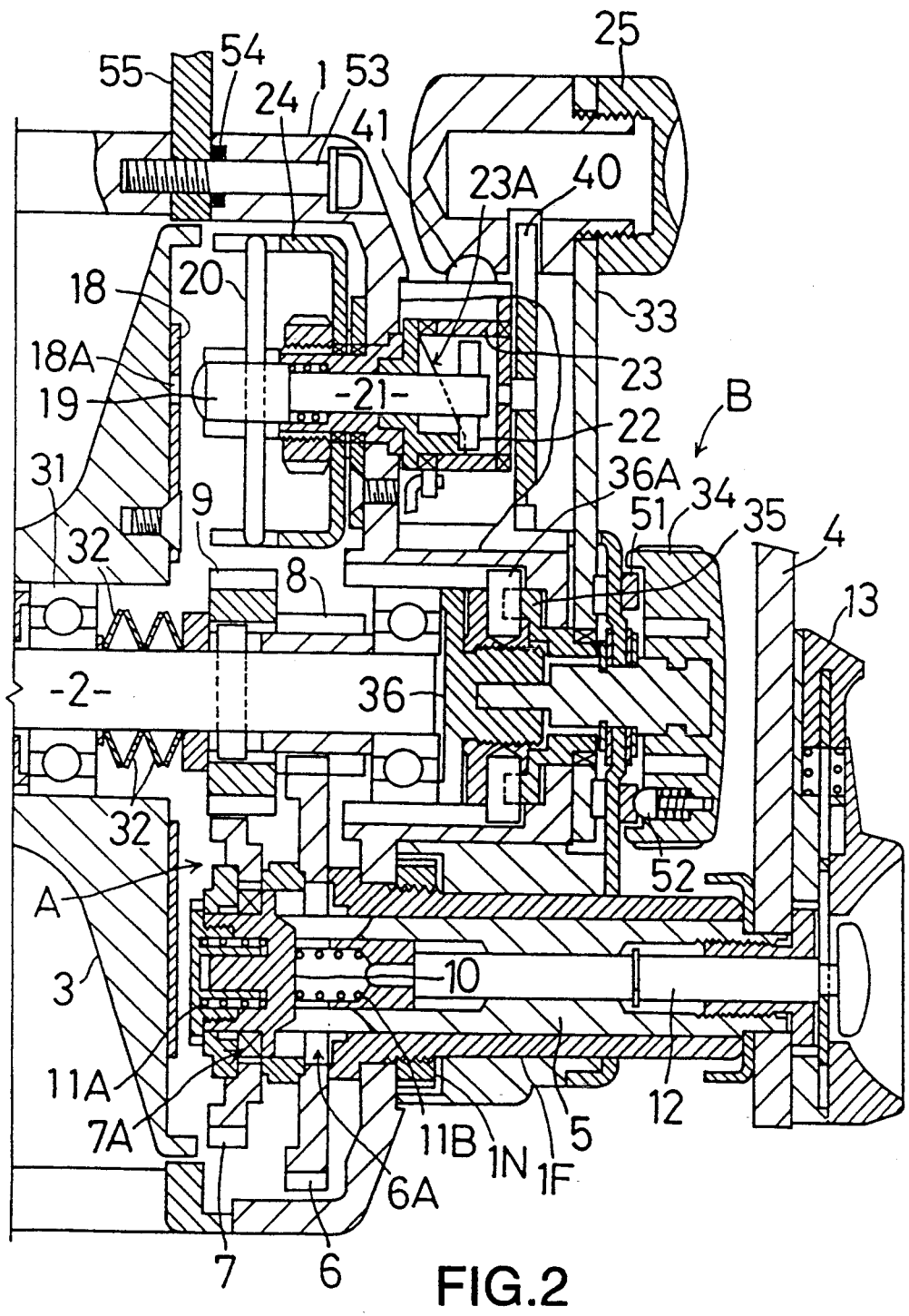
FIG. 2 is a sectional view of a righthand portion of the fishing reel.

As shown in FIGS. 1 and 2, a baitcasting reel in this embodiment has a reel body 1 in which a spool shaft 2 is disposed in horizontal posture for supporting a spool 3 freely rotatable relative thereto for winding a fishing line. A line winding transmission system includes a sleeve shaft 5 connected to a handle 4, and a change speed gear mechanism A and a drag mechanism D for transmitting drive from the sleeve shaft 5 to the spool 3.

The change speed gear mechanism A includes a first gear 6 for high speed winding, a second gear 7 for low speed winding, a third gear 8 and a fourth gear 9 mounted on the spool shaft 2 to be rotatable therewith and meshed with the first and second gears 6 and 7, respectively, and engaging element 10 slidably mounted on the sleeve shaft 5 to be selectively engageable with engaging bores 6A and 7A of the first and second gears 6 and 7 to transmit the drive from the sleeve shaft 5 to one of the gears 6 and 7, two compression springs 11A and 11B for urging the engaging element 10, and a control shaft 12 for determining position of the engaging element 10. With this change speed gear mechanism A, when the control shaft 12 is drawn outwardly, the engaging element 10 engages the engaging bore 6A of the first gear 6 under the urging force of the inner compression spring 11A. When the control shaft 12 is pushed in, the inner compression spring 11A is compressed whereby the engaging element 10 engages the engaging bore 7A of the second gear 7 under the urging force of the outer compression spring 11B.

Figure 6:
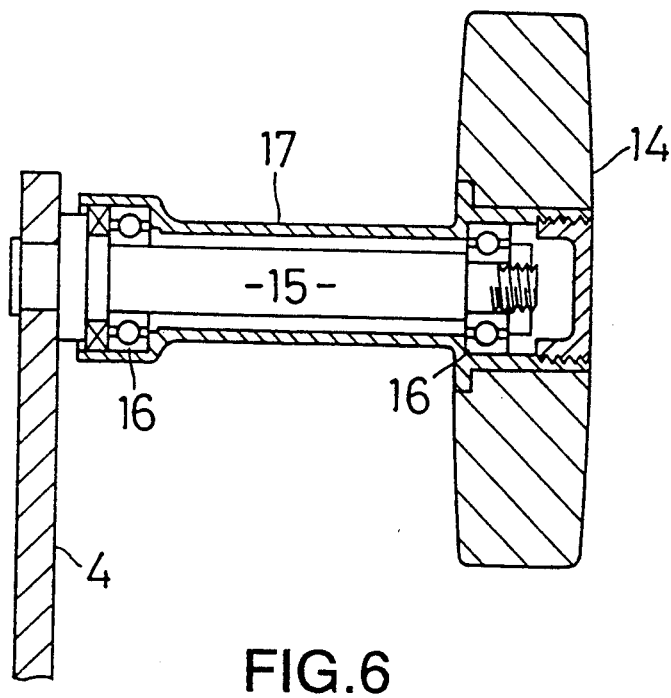
FIG. 6 is a sectional view of a handle grip.

The control shaft 12 includes an annular groove defined in an outer end position thereof, which is engageable with a slide type stopper 13 associated with the handle 4. The stopper 13 engages the annular groove when the control shaft 12 is pushed in, to maintain the control shaft 12 in that position. As shown in FIG. 6, the handle 4 has a grip 14 fixed to an end of a tubular member 17 rotatably supported by bearings 16 fitted on a shaft 15. This grip 14 facilitates a smooth line winding operation. Further, the sleeve shaft 5 is supported in a tubular frame 1F fixed to the reel body 1 by a nut 1N.

Figure 7:
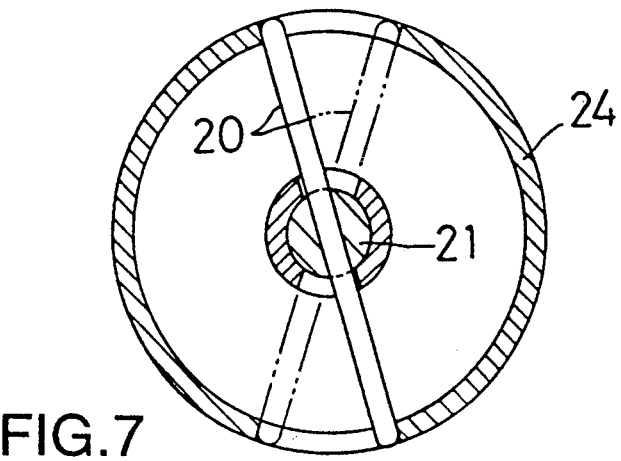
FIG. 7 is a sectional view of a resonant element.
Figure 8:
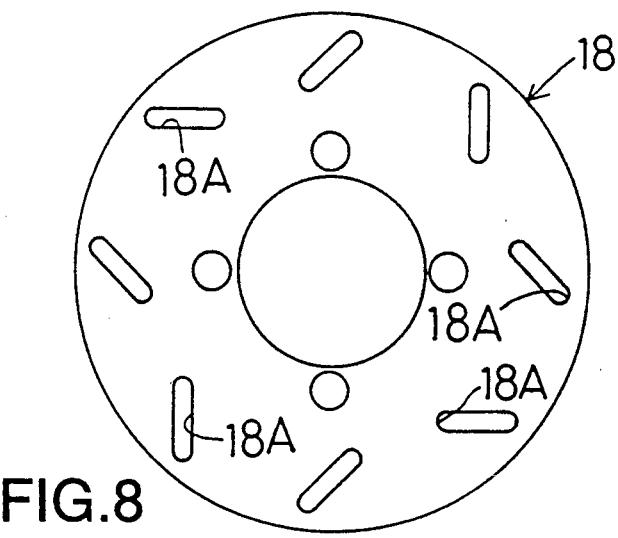
FIG. 8 is a side view of a disk.

Referring to FIGS. 2, 7 and 8, the spool 3 has a disk 18 attached to a side face thereof opposed to the handle 4, the disk 18 defining a plurality of grooves 18A inclined relative to the circumferential direction of the spool 3. The reel body 1 has a sound producing piece 20 mounted therein. The sound producing piece 20 includes a contact portion 19 at an end thereof for contacting the grooves 18A of the disk 18.

The sound producing piece 20 is mounted on a shaft member 21, and the contact portion 19 is defined at an end of the shaft member 21. The shaft member 21 carries a pin 22 attached to the other end thereof for contacting a cam surface 23A of a rotary type switching element 23. The switching element 23 is rotatable to switch the contact portion 19 between a position to contact the grooves 18A and a position retracted from the grooves 18A. When the spool 3 is rotated with the contact portion 19 contacting the grooves 18A, the sound producing piece 20 is reciprocated about the axis of the shaft member 21 to contact a resonant element 24, thereby to produce a clicking sound.

Figure 5:
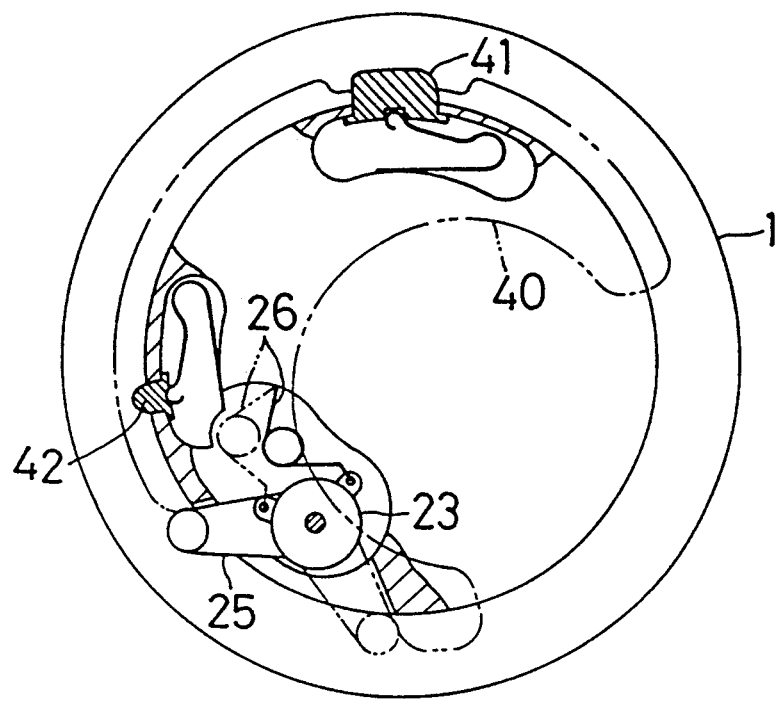
FIG. 5 is a schematic view of a right side surface of the reel.

As shown in FIG. 5, the switching element 23 is operable by a lever 25, and retainable by a toggle spring 26 in a position to produce the clicking sound and a position not to produce the clicking sound.

The reel body 1 has a left case accommodating a friction type drag mechanism D for applying a braking force to rotation of the spool 3 in a line unwinding direction under a tension acting on the fishing line. A braking force adjusting mechanism B is disposed outwardly of the righthand side of the reel body 1. Further, a braking force compensating device C is provided for checking a decrease in the braking force due to heating in an actual fishing situation.

The drag mechanism D includes a disk-like support member 28 mounted on the spool shaft 2 for torque transmission through a pin 27, a plastic disk 29 (one example of braking members) containing carbon fiber and fixed to the support member 28, and a disk 30 (one example of friction members) formed of stainless steel and fixed to a side surface of the spool 3. The braking force adjusting mechanism B is operable to displace the spool 3 toward the support member 28 through a bearing 31 mounted between the spool shaft 2 and spool 3, and through the braking force compensating device C and a belleville spring 32. The braking force adjusting mechanism B includes a lever type drag controller 33, a rotary type adjuster 34, a cam 35 connected to the drag controller 33, and a rotary element 36 connected to the adjuster 34. The braking force adjusting mechanism B also has a pressure transmission line for transmitting a moving force of the rotary element 36. That is, when the drag controller 33 or adjuster 34 is turned about the axis of the spool shaft 2, the cam 35 is moved relative to a pin 36A fixed to the rotary element 36. The resulting movement of the rotary element 36 is transmitted to the third and fourth gears 8 and 9, the belleville spring 32, bearing 31 and braking force compensating device C.

Figure 9:
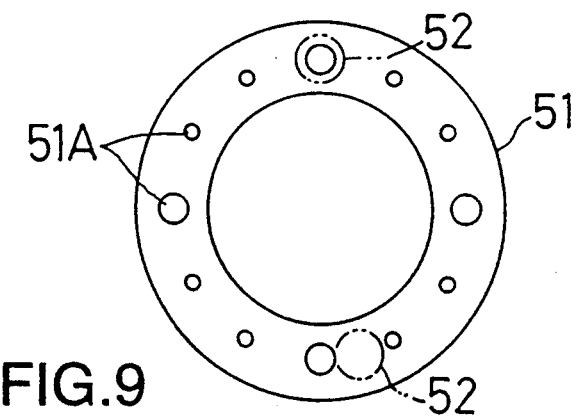
FIG. 9 is side view showing recesses formed in a ring.

A click mechanism is disposed between the adjuster 34 and reel body 1. As also shown in FIG. 9, the click mechanism includes a ring 51 defining a plurality of recesses 51A, and a pair of detents 52 for engaging the recesses 51A. The detents 52 are arranged in asymmetric positions to allow adjustment to be effected by a stroke smaller than intervals between the recesses 51A.

The braking force compensating device C includes a cylinder 37 slidable axially of the spool shaft 2, a piston 38 tightly fitted in the cylinder 37 and also axially slidable, and oil 39 contained in the cylinder 37. With this braking force compensating device C, the cylinder 37 and piston 38 are displaced away from each other by thermal expansion of the oil 39 due to a temperature increase, thereby to increase the braking force of the drag mechanism D.

The bearing 31, braking force compensating device C and belleville spring 32 also act as a retainer S for prohibiting free axial movement of the spool 3. The adjuster 34 is used for initial setting of a braking force, while the drag controller 33 is used to select a desired braking force at an actual fishing time. As shown in FIG. 5, the drag controller 33 is guided by a lever guide 40 to be set to a strike position by contact with a stopper 41. The drag controller 33 is capable of overriding a detent 42 to cancel the braking force of the drag mechanism D.

The braking force compensating device C further includes seals 43 mounted between the cylinder 37 and piston 38, and a plug 44 mounted in an opening formed in the cylinder 37 for filling in the oil and venting air.

When the handle 4 is turned with an appropriate braking force set to the drug mechanism D, drive is transmitted through the drag mechanism D to the side surface of the spool 3 to wind up the fishing line. When the tension of the fishing line exceeds a fixed value during a struggle with fish in an actual fishing situation, slipping occurs between the friction surfaces of the drag mechanism D to prevent breaking of the fishing line. When heat is generated by the drag mechanism D maintained in a slipping state over a long time, the heat is conducted through the metallic spool 3 to the braking force compensating device C. As a result, the oil 39 is expanded to extend the cylinder 37 and piston 38. This produces a pressure to push the spool 3 toward the support member 28, whereby the drag mechanism D maintains the selected braking force.

Figure 3:
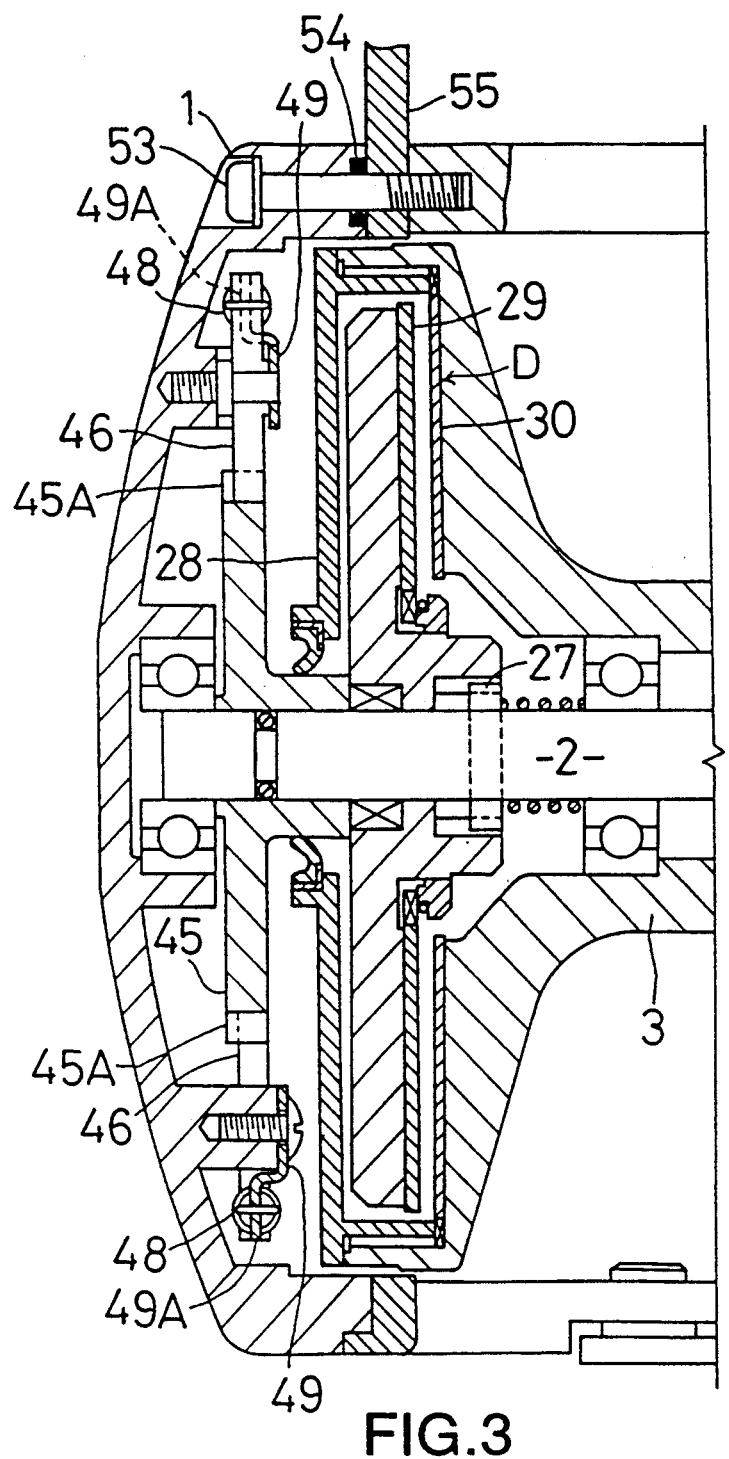
FIG. 3 is a sectional view of a lefthand portion of the fishing reel.
Figure 4:
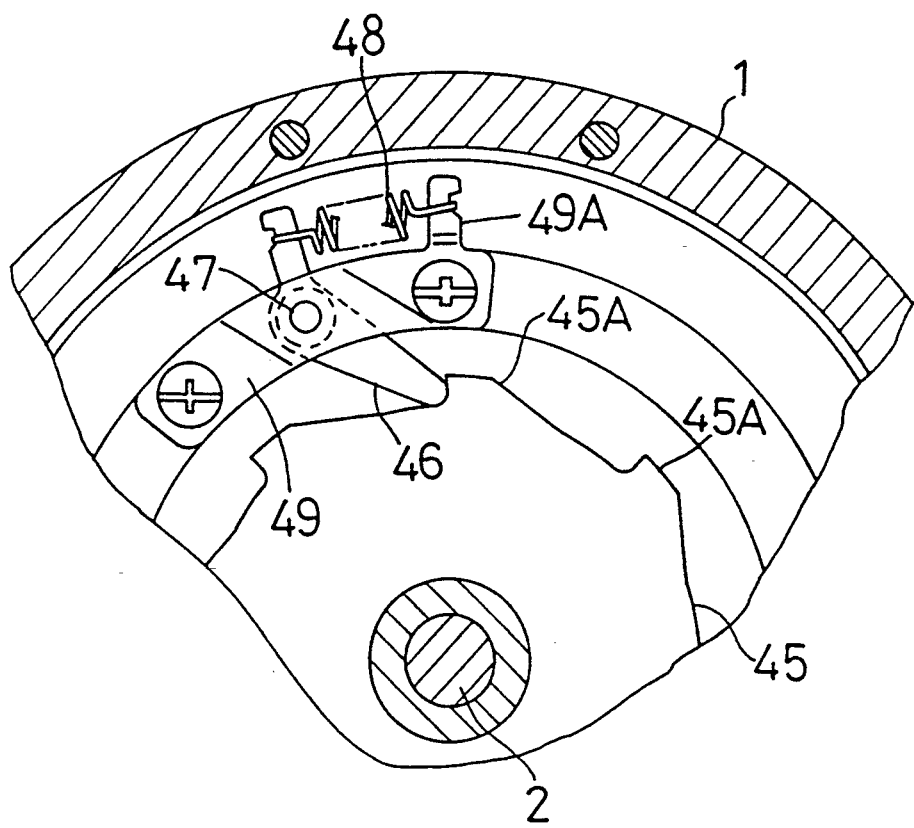
FIG. 4 is a side view showing a pawl supporting structure.

As shown in FIGS. 3 and 4, the spool shaft 2 supports a ratchet wheel 45 mounted thereon for torque transmission with the support member 28. Pawls 46 are pivotably supported on support axes 47 for engaging teeth of the ratchet wheel 45. Each support axis 47 is supported at an end thereof by a plate 49 having a spring engaging hook 49A for engaging one end of a spring 48. This construction prevents the spool 4 from rotating backward when the drag mechanism D is in operation.

The reel body 1 includes right and left wall members interconnected by bolts 53 and pressed against holders 55 through O-rings 54 mounted on the bolts 53 to prevent chattering.

Figure 10:
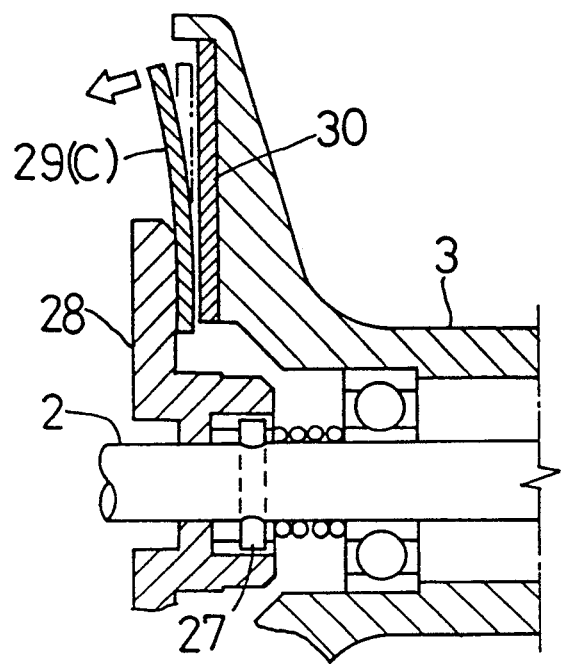
FIG. 10 is a sectional view of another embodiment.

The foregoing embodiment may be modified as follows:

(a) FIG. 10 shows a drag mechanism D whose braking force increases with a temperature increase. This drag mechanism D includes a braking member 29 formed of a bimetal or a shape memory alloy. The braking member 29 acts as a braking force compensating device C with a characteristic to become deformed away from the friction member 30 when heated.

Figure 11:
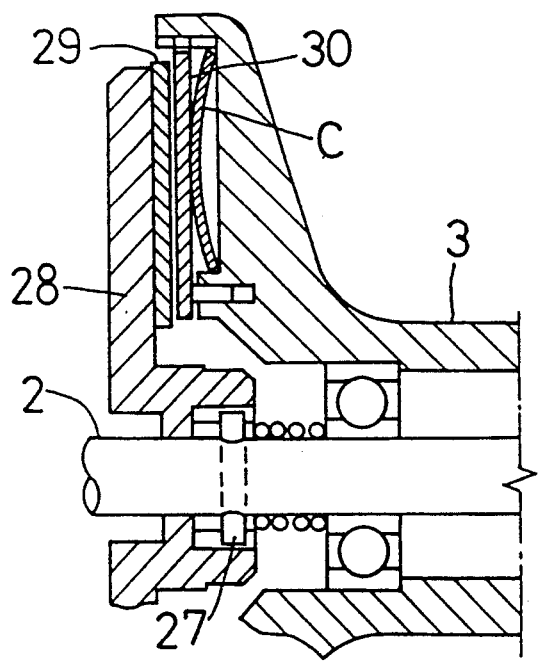
FIG. 11 is a sectional view of a further embodiment.

(b) FIG. 11 shows a different drag mechanism D which includes a braking force compensating device C mounted between a friction member 30 and the side surface of the spool 3. The braking force compensating device C is formed of a bimetal or a shape memory alloy displaying a characteristic, when heated, to push the friction member 30 away from the side surface of the spool 3 or to allow the friction member 30 to approach the side surface.

This construction is applicable to a drag mechanism D whose braking force may increase or decrease with a temperature increase.

Figure 12:
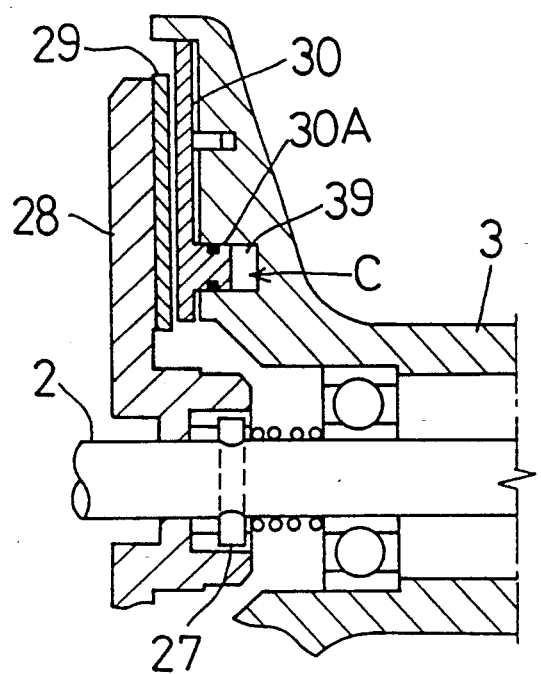
FIG. 12 is a sectional view of a still further embodiment.

(c) In FIG. 12, a braking force compensating device C includes a cylindrical recess formed in the side surface of the spool 3, a piston 30A formed on the friction member 30 and inserted into the recess, and oil 39 place between the recess and piston 30A. This construction adjusts the braking force of a drag mechanism D which increases with a temperature increase.

(d) The belleville spring 32 shown in FIG. 1 may be formed of a bimetal or the like deformable with a temperature increase. Then the belleville spring 32 acts also as a braking force compensating device C.

(e) In the first embodiment, the braking force of the drag mechanism d is adjusted by movement of the spool. Instead, the braking force may be adjusted by movement of the braking member.

Figure 13:
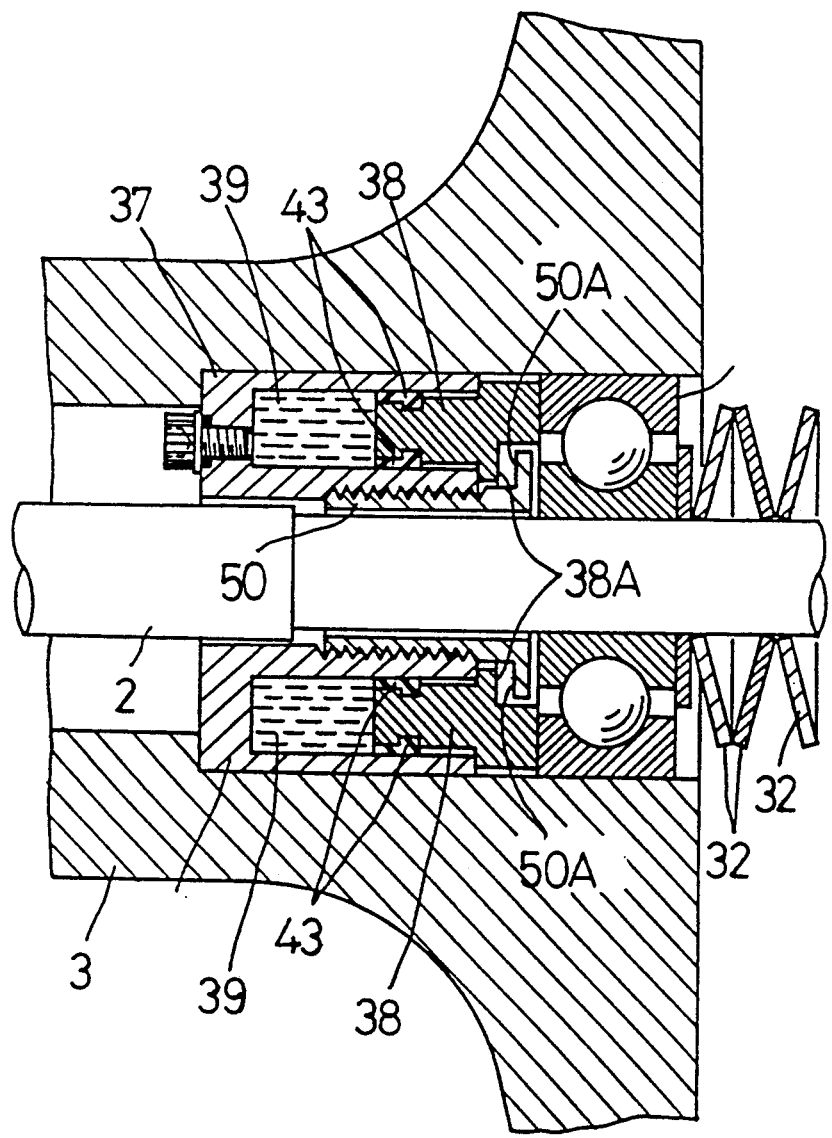
FIG. 13 is a sectional view of a still further embodiment in which a braking force compensating device includes a restrictor.

(f) FIG. 13 shows a different braking force compensating device C including a restrictor for limiting, within a predetermined range, the movement of the spool for adjusting the braking force. This braking force compensating device C is effective to prevent breaking of the fishing line of seizure of the friction member due to an excessive braking force occurring in the event of overheating.

Specifically, as shown in FIG. 13, a tubular restrictor 50 is mounted between the spool shaft 2 and an inner boss of a cylinder 37 and screwed to the inner boss. The tubular restrictor 50 includes a large diameter portion and a small diameter portion, a boundary of which defines a step 50A on an outer periphery thereof. A piston 38 includes a projection 38A formed on an inner peripheral wall thereof and disposed adjacent the small diameter portion of the restrictor 50. The projection 38A is movable into contact with the step 50A to limit extension of the piston 38. In this way, the displacement of the piston 38 relative to the cylinder 37 is limited within a predetermined range to preclude the possibility of an excessive braking force, thereby avoiding breaking of the fishing line and seizure of the friction member.

Instead of the above construction, the cylinder 37 and piston 38 may be formed of materials having different coefficients of expansion such that, at a predetermined temperature, the cylinder 37 clamps the piston 38 against movement.

The cylinder 37 and piston 38 per se may be constructed to be engageable with each other.

The restrictor 50 may be modified to be movable to provide variable limiting positions.

What is claimed is:

1. A drag apparatus for a fishing reel comprising:
   a transmission line including:
     a spool,
     a spool shaft supporting said spool,
     a support member rotatable in unison with said spool shaft,
     a braking member rotatable in unison with said support member, and
     a friction member rotatable in unison with said spool; and
   drag force compensating means provided separately from said transmission line; p1 wherein a drag force generated between said spool shaft and said spool is adjusted by axially moving said spool to adjust a pressing force between said braking member and said friction member, and wherein said drag force compensating means adjusts said drag force by utilizing heat generated in association with use of said drag apparatus.

2. A drag apparatus as claimed in claim 1, wherein said drag force compensating means is operable, in response to the heat transmitted from said drag mechanism, to increase said drag force, thereby to compensate for a decrease of said drag force caused by the heat.

3. A drag apparatus as claimed in claim 2, wherein said drag force compensating means is operable to compensate for the decrease of the drag force by increasing said pressing force between said braking member and said friction member.

4. A drag apparatus as claimed in claim 3, wherein said drag force compensating means includes a cylinder mounted in said spool to be coaxial with said spool shaft and rigidly connected to said spool, a piston fitted in an opening of said cylinder to be slidable axially of said spool shaft relative to said cylinder, and oil contained between said cylinder and said piston, and wherein said piston is pushed outwardly relative to said cylinder by expansion of said oil caused by the heat transmitted from said drag mechanism during use, to increase said pressing force between said friction member and said braking member of said drag mechanism, thereby to compensate for variations of the drag force.

5. A drag apparatus as claimed in claim 4, wherein said drag force compensating means includes a metal such as copper having a high coefficient of heat conduction attached to an inside wall of said spool to facilitate conduction of the heat from said drag mechanism to said drag force compensating means.

6. A drag apparatus as claimed in claim 4, wherein said piston and said cylinder are annular.

7. A drag apparatus as claimed in claim 3, wherein said drag force compensating means includes a bimetal or a shape memory alloy having a curved sectional shape and disposed rearwardly of said friction member, said drag force compensating means being deformable in response to the heat generated with said drag mechanism to move said friction member axially of said spool shaft, thereby to vary the pressing force between said braking member and said friction member to compensate for variations of said drag force.

8. A drag apparatus as claimed in claim 3, wherein said drag force compensating means includes a cylinder defined in a side surface of said spool and expending axially of said spool shaft, a piston projecting from said friction member into an opening of said cylinder and slidable axially of said spool shaft, and oil contained in an interior space of said cylinder defined by said cylinder and said piston, and wherein said piston is pushed outwardly relative to said cylinder by expansion of said oil caused by the heat conducted from said drag mechanism during use, to increase said pressing force between said friction member and said braking member of said drag mechanism, thereby to compensate for variations of the drag force.

9. A drag apparatus as claimed in claim 1, wherein said drag force compensating means is operable, in response to the heat, to decrease said drag force, thereby to compensate for an increase of said drag force caused by the heat.

10. A drag apparatus as claimed in claim 9, wherein said drag force compensating means is operable, in response to the heat, to reduce said pressing force between said bracking member and said friction member, thereby to compensate for an increase of said drag force caused by the heat.

11. A drag apparatus as claimed in claim 10, wherein said drag force compensating means includes a braking member formed of a bimetal or a shape memory alloy deformable in proportion to temperatures thereof in a direction to move away from said friction member opposed thereto in response to the heat generated with said drag mechanism during use, thereby to decrease the pressing force between said friction member and said braking member to compensate for variations of said drag force.

12. A drag apparatus as claimed in claim 10, wherein said drag force compensating means includes a bimetal or a shape memory alloy having a curved sectional shape disposed rearwardly of said friction member, said drag force compensating means being deformable in response to the heat generated by said drag mechanism to move said friction member axially of said spool shaft, thereby to vary said pressing force between said braking member and said friction member to compensate for variations of said drag force.

13. A drag apparatus for a fishing reel comprising:
a spool having a spool shaft;
drive transmitting means for rotating said spool;
a drag mechanism including a first contact member operatively connected to said spool, and a second contact member operatively connected to said drive transmitting means, said first and second contact members being contactable with each other to apply a drag force to said spool;
drag force compensating means for varying a spacing between said first and second contact members in proportion to heat generated by said drag mechanism during use, thereby to compensate for variations of the drag force caused by the heat generated by said drag mechanism;
wherein said drag force compensating means is operable, in response to the heat, to decrease the spacing between said first and second contact members, thereby to compensate for a decrease of said drag force caused by the heat;
wherein said drag force compensating means includes an annular piston, and wherein said drag force compensating means includes a cutout formed in an inside wall of said annular piston, and a restrictor defining a stopper for engaging said cutout, said restrictor being mounted on said cylinder to define, when at normal temperature, a predetermined space between said stopper and a surface of said cutout extending perpendicular to the axis of said spool shaft, whereby said drag force compensating means provides a predetermined limiting position for the movement of said piston outwardly of said cylinder due to expansion of said oil caused by the heat conducted from said drag mechanism.

14. A drag apparatus as claimed in claim 13, wherein said restrictor is screwed to an outer surface of said cylinder for adjusting the space between said stopper and said surface of said cutout extending perpendicular to the axis of said spool shaft.

15. A drag apparatus for a fishing reel comprising:
a transmission line including:
a transmission line including:
a spool,
a spool shaft supporting said spool, a support member rotatable in unison with said spool shaft, a bracking member rotatable in unison with said support member, and a friction member rotatable in unison with said spool; and drag force compensating means provided separately from said transmission line;

wherein a drag force generated between said spool shaft and said spool is adjusted by axially moving said spool to adjust a pressing force between said braking member and said friction member, and wherein said drag force compensating means is operable, in response to heat transmitted from said bracking member and said friction member, to increase said drag force, thereby to compensate for a decrease of said drag force caused by said heat.

16. A drag apparatus for a fishing reel comprising:

a transmission line including:

a spool, a spool shaft supporting said spool, a support member rotatable in unison with said spool shaft, a braking member rotatable in unison with said support member, and a friction member rotatable in unison with said spool; and drag force compensating means provided separately from said transmission line, said drag force compensating means including:

an annular cylinder mounted in said spool, said cylinder being coaxial with said spool shaft and rigidly connected to said spool, said cylinder having an opening, an annular piston fitted in said opening of said cylinder, said piston being slidable axially of said spool shaft relative to said cylinder, and oil contained between said cylinder and said piston; and wherein a drag force generated between said spool shaft and said spool is adjusted by axially moving said spool to adjust a pressing force between said braking member and said friction member; and wherein said piston is pushed outwardly relative to said cylinder by expansion of said oil caused by heat transmitted from said braking member and said friction member during use, to increase said pressing force between said friction member and said braking member, thereby to compensate for variations of the drag force.

17. A drag apparatus for a fishing reel comprising:

a transmission line including:

a spool, a spool shaft supporting said spool, a support member rotatable in unison with said spool shaft, a bracking member rotatable in unison with said support member, a friction member rotatable in unison with said spool; and drag force compensating means provided separately from said transmission line, said drag force compensating means including:

a piston, a cylinder provided to said spool, and a restrictor mounted on said cylinder, said restrictor including a stopper engageable with said cylinder, a predetermined space being formed between said stopper and said cylinder at normal temperature;

wherein a drag force generated between said spool shaft and said spool is adjusted by axially moving said spool to adjust a pressing force between said braking member and said friction member; and wherein said drag force compensating means is operable, in response to heat transmitted from said braking member and said friction member, to increase said drag force, thereby to compensate for a decrease of said force caused by said heat; and wherein said restrictor restricts movement of said piston outwardly relative to said cylinder caused by expansion of said oil due to said heat.

18. A drag apparatus as claimed in claim 17, wherein said piston includes a cutout in an inner wall thereof, said cutout having a surface extending perpendicular to the axis of said spool shaft.

19. A drag apparatus as claimed in claim 17, wherein said piston and said cylinder are annular.

* * * * *